United States Patent
Nakayama et al.

(10) Patent No.: US 9,608,239 B2
(45) Date of Patent: Mar. 28, 2017

(54) BATTERY AND METHOD FOR PRODUCING THE BATTERY

(71) Applicants: TOYOTA JIDOSHA KABUSHIKI KAISHA, Toyota-shi, Aichi (JP); PRIMEARTH EV ENERGY CO., LTD., Kosai-shi, Shizuoka (JP)

(72) Inventors: Hiroyuki Nakayama, Toyota (JP); Satoshi Suzuki, Toyota (JP); Takashi Harayama, Toyota (JP); Youichi Naruse, Nagoya (JP); Kaoru Kajita, Toyohashi (JP); Toshiya Okada, Toyota (JP); Takamasa Kajiwara, Hamamatsu (JP)

(73) Assignees: TOYOTA JIDOSHA KABUSHIKI KAISHA, Toyota (JP); PRIMEARTH EV ENERGY CO., LTD., Kosai-shi (JP)

( * ) Notice: Subject to any disclaimer, the term of this patent is extended or adjusted under 35 U.S.C. 154(b) by 295 days.

(21) Appl. No.: 14/396,243

(22) PCT Filed: Mar. 29, 2013

(86) PCT No.: PCT/JP2013/059521
§ 371 (c)(1),
(2) Date: Oct. 22, 2014

(87) PCT Pub. No.: WO2014/002560
PCT Pub. Date: Jan. 3, 2014

(65) Prior Publication Data
US 2015/0118546 A1    Apr. 30, 2015

(30) Foreign Application Priority Data
Jun. 28, 2012 (JP) ................................ 2012-145126

(51) Int. Cl.
*H01M 2/02* (2006.01)
*H01M 2/04* (2006.01)
(Continued)

(52) U.S. Cl.
CPC ........... *H01M 2/021* (2013.01); *H01M 2/024* (2013.01); *H01M 2/0217* (2013.01);
(Continued)

(58) Field of Classification Search
CPC .. H01M 2/0207–2/0217; H01M 2/024; H01M 2/04–2/0404; H01M 2/0426; H01M 2/045; H01M 2/0469–2/0473
See application file for complete search history.

(56) References Cited

U.S. PATENT DOCUMENTS

| | | | | |
|---|---|---|---|---|
| 5,879,416 A | * | 3/1999 | Nakamura | B23K 26/28 219/121.64 |
| 6,264,708 B1 | * | 7/2001 | Haraguchi | B23K 26/28 219/121.64 |

(Continued)

FOREIGN PATENT DOCUMENTS

| | | |
|---|---|---|
| JP | A-7-183012 | 7/1995 |
| JP | A-11-90657 | 4/1999 |

(Continued)

OTHER PUBLICATIONS

International Search Report issued in International Patent Application No. PCT/JP2013/059521 dated Apr. 23, 2013.

*Primary Examiner* — Jonathan Crepeau
*Assistant Examiner* — Jacob Buchanan
(74) *Attorney, Agent, or Firm* — Oliff PLC

(57) ABSTRACT

A battery includes an external terminal member and an insulating member on an outer surface of a lid member so that an interval between the insulating member and the lid member is smaller in a long side of the lid member than in a short side. A weld mark is formed over the entire circumference of the lid member to extend across the outer surface of the lid member and an open end face of the case body. The weld mark not only extends across the outer surface of the lid member and the open end face of the case body but also (Continued)

Rear ← → Front reaches an outer side surface of the case body in a zone of the long side of the lid member facing the insulating member, but does not reach the outer side surface of the case body in a zone except the former zone.

15 Claims, 14 Drawing Sheets

(51) Int. Cl.
  *H01M 10/04* (2006.01)
  *H01M 2/30* (2006.01)
  *H01M 2/22* (2006.01)

(52) U.S. Cl.
  CPC ....... *H01M 2/0426* (2013.01); *H01M 2/0439* (2013.01); *H01M 2/0473* (2013.01); *H01M 2/22* (2013.01); *H01M 2/30* (2013.01); *H01M 10/04* (2013.01); *Y10T 29/4911* (2015.01)

(56) References Cited

U.S. PATENT DOCUMENTS

| | | | |
|---|---|---|---|
| 6,573,000 B1 | 6/2003 | Miyazaki et al. | |
| 2004/0131929 A1* | 7/2004 | Anglin | H01M 2/0207 429/161 |
| 2005/0136323 A1* | 6/2005 | Sugimune | H01M 2/0426 429/174 |
| 2006/0207085 A1* | 9/2006 | Nakagawa | H01G 9/06 29/623.1 |
| 2009/0233168 A1* | 9/2009 | Yoshida | H01M 2/08 429/185 |
| 2010/0247989 A1* | 9/2010 | Kim | H01M 2/20 429/94 |
| 2012/0079713 A1 | 4/2012 | Hosokawa et al. | |
| 2012/0315533 A1 | 12/2012 | Yoshida et al. | |

FOREIGN PATENT DOCUMENTS

| | | |
|---|---|---|
| JP | A-11-213967 | 8/1999 |
| JP | A-2000-268781 | 9/2000 |
| JP | A-2003-181666 | 7/2003 |
| JP | A-2005-174903 | 6/2005 |
| JP | A-2006-19089 | 1/2006 |
| JP | A-2006-260883 | 9/2006 |
| JP | A-2009-218099 | 9/2009 |
| JP | A-2010-238558 | 10/2010 |
| JP | A-2011-181215 | 9/2011 |
| JP | 2012-079476 A | 4/2012 |
| JP | A-2014-10887 | 1/2014 |
| WO | 2010/095224 A1 | 8/2010 |

* cited by examiner

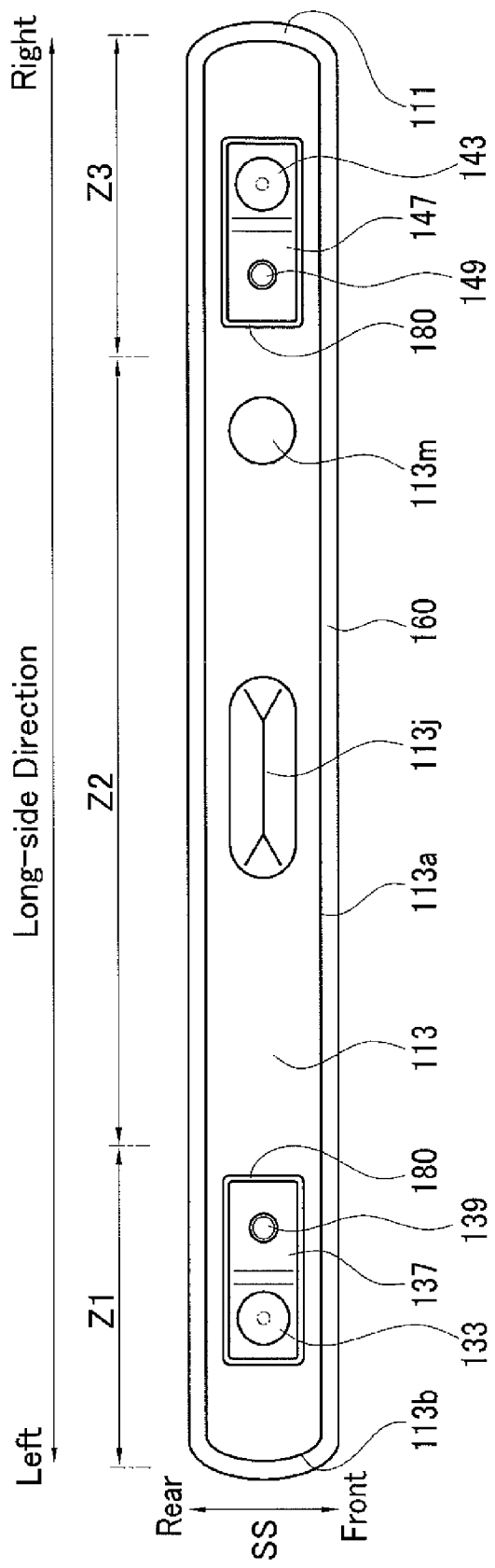

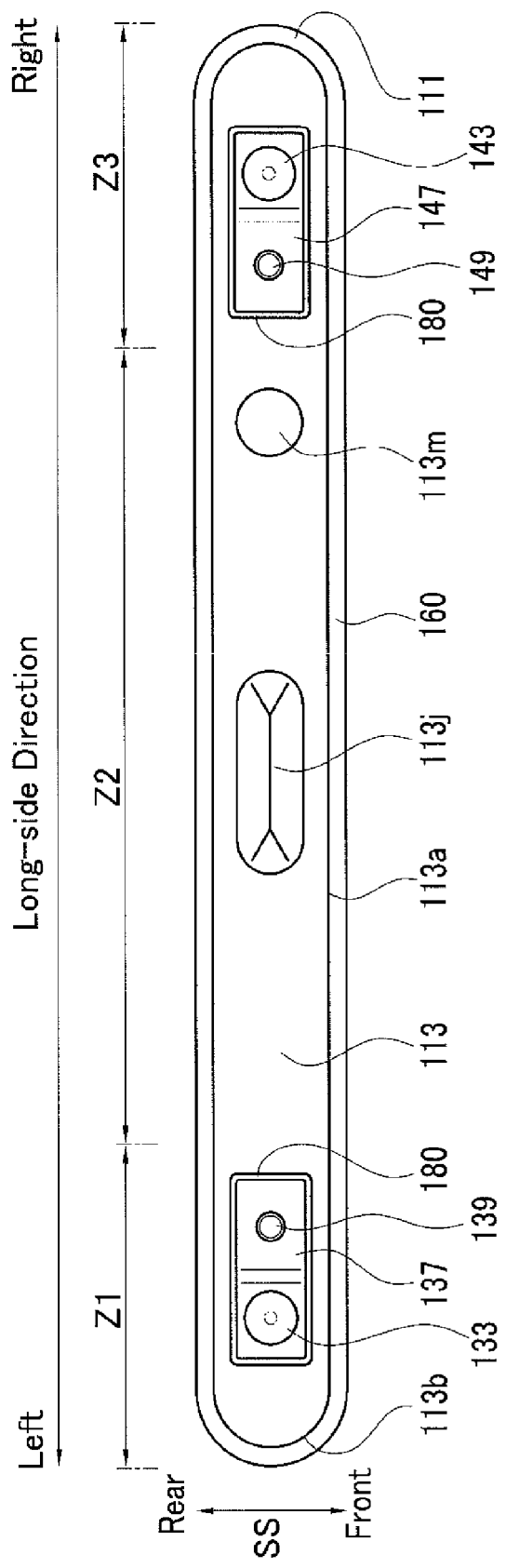

BATTERY AND METHOD FOR PRODUCING THE BATTERY

CROSS-REFERENCE TO RELATED APPLICATIONS

This is a US national phase application based on the PCT International Patent Application No. PCT/JP2013/059521 filed on Mar. 29, 2013, and claiming the priority of Japanese Patent Application No. 2012-145126, filed on Jun. 28, 2012, the entire contents of which are herewith incorporated by reference.

TECHNICAL FIELD

The present invention relates to a battery in which a power generating element is enclosed in a battery case of a flattened shape, and a method for producing the battery. More particularly, the present invention relates to a battery in which an external terminal member being connected to a power generating element and also functioning as an external terminal is provided penetrating through a lid member of a battery case, and an insulating member insulating between the external terminal member and the lid member is placed on an outer surface of the lid member, and a method for producing the battery.

BACKGROUND ART

One example of conventional batteries is a battery disclosed in Patent Document 1. A battery shown in FIG. 2 of this document has a flattened overall shape configured such that a "sealing plate 31" is fit in an opening of an "outer casing 10" opening at its one end. In the outer casing 10, a "spiral electrode body 20" is contained. In this battery, boundary portions of an open end face of the outer casing 10 and the sealing plate 31 are welded, thereby fixing the sealing plate 31 to the outer casing 10. This welding is made by irradiation of a "laser beam 50" from above to such areas to be welded (welding areas).

RELATED ART DOCUMENTS

Patent Documents

Patent Document 1: JP-A-2000-268781

SUMMARY OF INVENTION

Problems to be Solved by the Invention

However, the aforementioned technique of Patent Document 1 has the following problems. As appearing in FIG. 2 of Patent document 1, the sealing plate 31 is provided with an "electrode terminal 32" and a "gasket 33" surrounding the terminal 32. Since the battery has a flattened outer shape, some sections have little interval or distance between the welding areas and the gasket 33. During welding, therefore, the gasket 33 may be damaged due to welding heat. In particular, according to the variety of battery, there may be a case where an insulating component corresponding to the gasket 33 is provided projecting outward from the outer surface of a lid member corresponding to the sealing plate 31. In such a case, particularly, the insulating component may be exposed to and burned by a plume (metal vapor or plasma) rising from the welding area during welding. This causes deterioration of the insulating component and insulating and sealing failures.

The present invention has been made to solve the above problems of the conventional techniques and has a purpose to provide a battery configured to prevent a member(s) on a lid member from being burned by plumes during welding, and a method for producing the battery.

Means of Solving the Problems

To achieve the above purpose, one aspect of the invention provides a battery including: a case body having a flattened shape and including an open end and internally containing a power generating element; and a lid member formed in a shape having long side parts and short side parts and placed to close an opening of the case body, wherein the battery further includes: external terminal members provided to penetrate through the lid member and connected to the power generating element in the case body and partially exposed to outside; and insulating members placed on at least an outer surface of the lid member to insulate the external terminal member from the lid member, an interval between an edge of the insulating member and a long side of the lid member is smaller than an interval between an edge of the insulating member and a short side of the lid member, the lid member is fitted in the opening of the case body, a weld mark extending across the outer surface of the lid member and an open end face of the case body is formed along an entire circumference of the lid member so that the lid member is fixed to the case body and inside of the case body is hermetically sealed from external environment, and a zone of the lid member along the long side at least facing the insulating member is a wide-width weld mark zone in which the weld mark is formed to reach an outer side surface of the case body in addition to the outer surface of the lid member and the open end face of the case body, wherein the weld mark is formed to have a weld spreading depth of a cross section is larger in the wide-width weld mark zone than in a zone except the wide-width weld mark zone, and the weld mark is formed to be spread into the lid member from an extended line extended to a surface of the weld mark from a boundary between the lid member and the case body in an unmelted portion during welding, and wherein the external terminal member and the insulating member are respectively provided in positions close to both ends of the lid member in a long side direction.

Another aspect of the invention provides a method for producing a battery including: a case body having a flattened shape and including an open end and internally containing a power generating element; and a lid member formed in a shape having long side parts and short side parts and placed to close an opening of the case body, wherein the battery to be produced includes: external terminal members provided to penetrate through the lid member and connected to the power generating element in the case body and partially exposed to outside; and insulating members placed on at least an outer surface of the lid member to insulate the external terminal member from the lid member, the external terminal members and the insulating members are placed in positions close to both ends of the lid member in a long side direction, an interval between an edge of the insulating member and a long side of the lid member is smaller than an interval between an edge of the insulating member and a short side of the lid member, wherein the method includes: fitting the lid member in the opening of the case body without covering an open end face of the case body; welding a boundary between the outer surface of the lid member and the open end face of the case body along an entire circumference of the lid member to fix the lid member to the case body and hermetically seal inside of the case body from external environment, energy used for the welding is set to: a first energy level for at least the zone of the lid member along the long side facing the insulating member to form a melted area extending an outer side surface of the case body in addition to the outer surface of the lid member and the open end face of the lid member, the melted area being to be a weld mark, and a second energy level for the zone except the zone subjected to the energy of the first level, the second level being equal to or less than the first level.

With the above configuration, when the zone facing the insulating member along the long side of the lid member is to be welded, this welding is performed with the first level energy (large energy), so that a plume is caused to be ejected in an outward tilting direction. This prevents deterioration in the insulating member and others due to the plume during welding. By this high energy welding, the wide-width weld mark zone is formed.

The zone except the wide-width weld mark zone includes a zone on a short side of the lid member. In the zone except the wide-width weld mark zone, the weld mark is formed over the outer surface of the lid member and the open end face of the case body and also just locally on the outer side surface of the case body. Specifically, the weld mark in the zone except the wide-width weld mark does not reach the outer side surface of the case body or covers just locally even when reaches. The second level of welding energy for the zone except the wide-width weld mark zone is equal to or lower than the first level, preferably, is lower than the first level.

In the above configured battery, preferably, a center line direction of an approximate sector shape defined by a portion having a circular arc surface of the weld mark in cross section is tilted more outward in the wide-width weld mark than in a zone except the wide-width weld mark. In the above configured battery, still preferably, a value obtained by dividing a weld spreading width of the weld mark into the case body by a weld spreading width into the lid member when the weld mark is seen from outside with respect to a boundary between the outer surface of the lid member and the case body in an unmelted area during welding is larger in the wide-width weld mark zone than in the zone except the wide-width weld mark zone. Alternatively, it is preferable that a value obtained by dividing a surface length of the weld mark located within the case body by a surface length within the lid member in cross section with respect to the extended line is larger in the wide-width weld mark than in the zone except the wide-width weld mark zone.

In the above configured battery, it is desirable that the wide-width weld mark zone is formed in the long side direction of the lid member over a zone facing one of the insulating members, a zone facing the other insulating member, and an intermediate zone between the zones. In the method for producing the above configured battery, preferably, the welding using the first level energy is performed on the lid member in the long side direction over the zone facing one of the insulating members, the zone facing the other insulating member, and an intermediate zone between the zones. This configuration is more advantageous in bonding strength of the lid member and the case body.

Effects of the Invention

According to the above configuration, there are provided a battery with a member(s) on a lid member prevented from being burned due to a plume during welding, and a method for producing the battery.

BRIEF DESCRIPTION OF THE DRAWINGS

FIG. 19 is a plan view showing an overall shape of a case lid in a modified example of the invention; and FIG. 20 is a plan view showing an overall shape of a case lid in another modified example of the invention.

MODE FOR CARRYING OUT THE INVENTION

Figure 1:
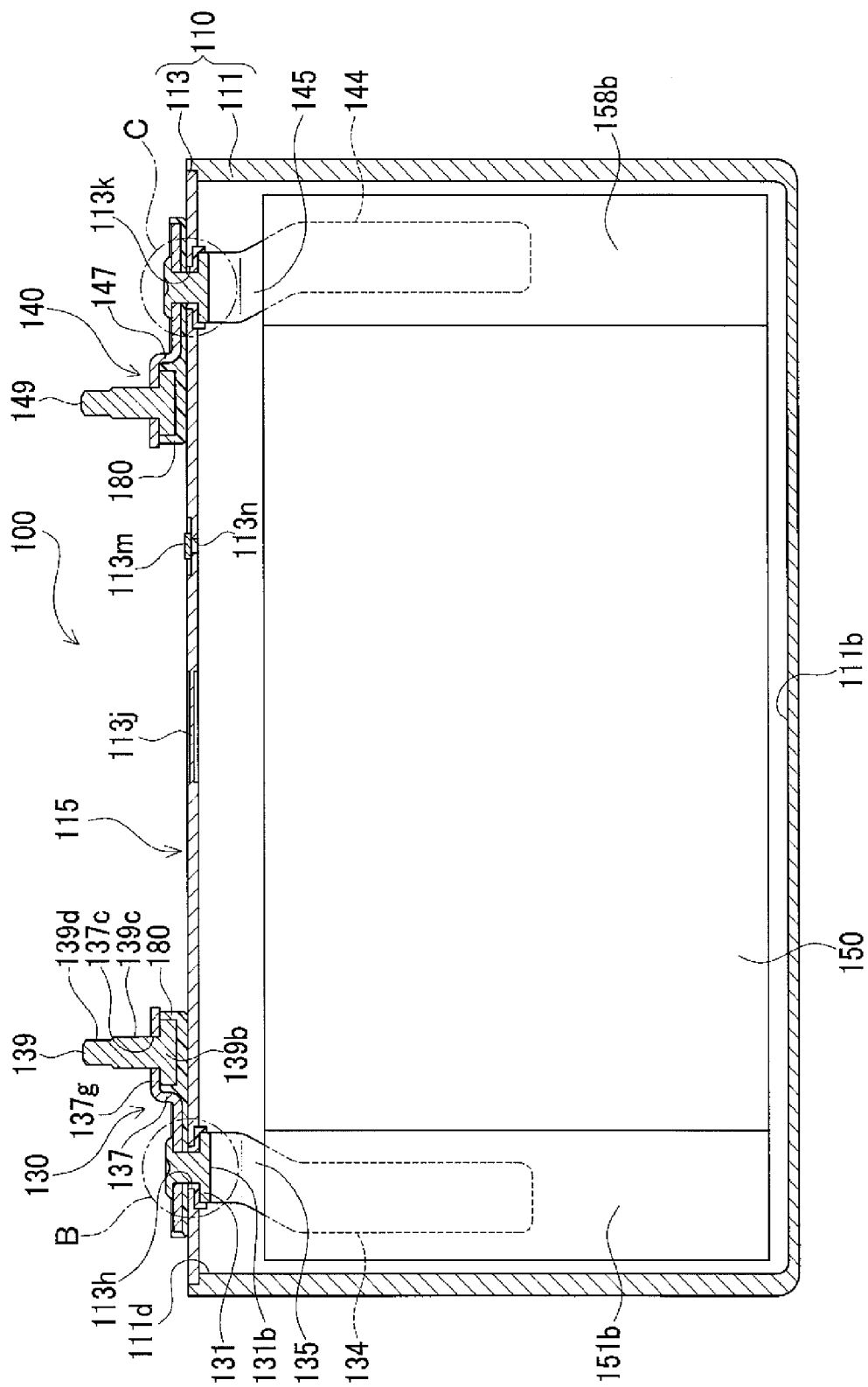
FIG. 1 is a cross sectional view of a battery in an embodiment.
Figure 2:
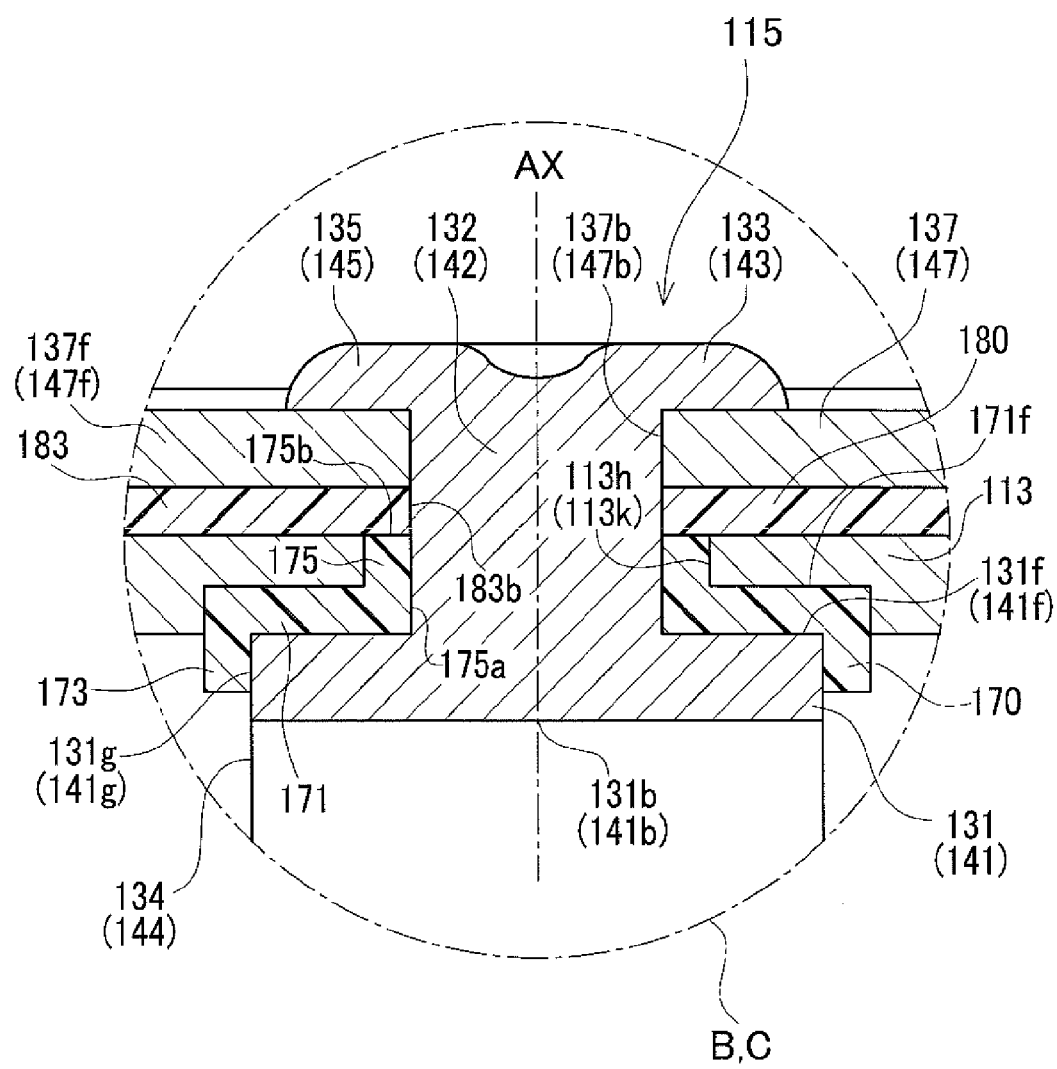
FIG. 2 is an enlarged view of a section B and a section C in FIG. 1.

A detailed description of an embodiment of the present invention will now be given referring to the accompanying drawings. FIG. 1 is a cross sectional view of a battery 100 in the present embodiment. FIG. 2 is an enlarged view of a section B and a section C in FIG. 1. In FIG. 2, parts or components assigned doubly with parenthesized reference signs and unparenthesized reference signs represent those which are different between the section B and the section C.

Figure 3:
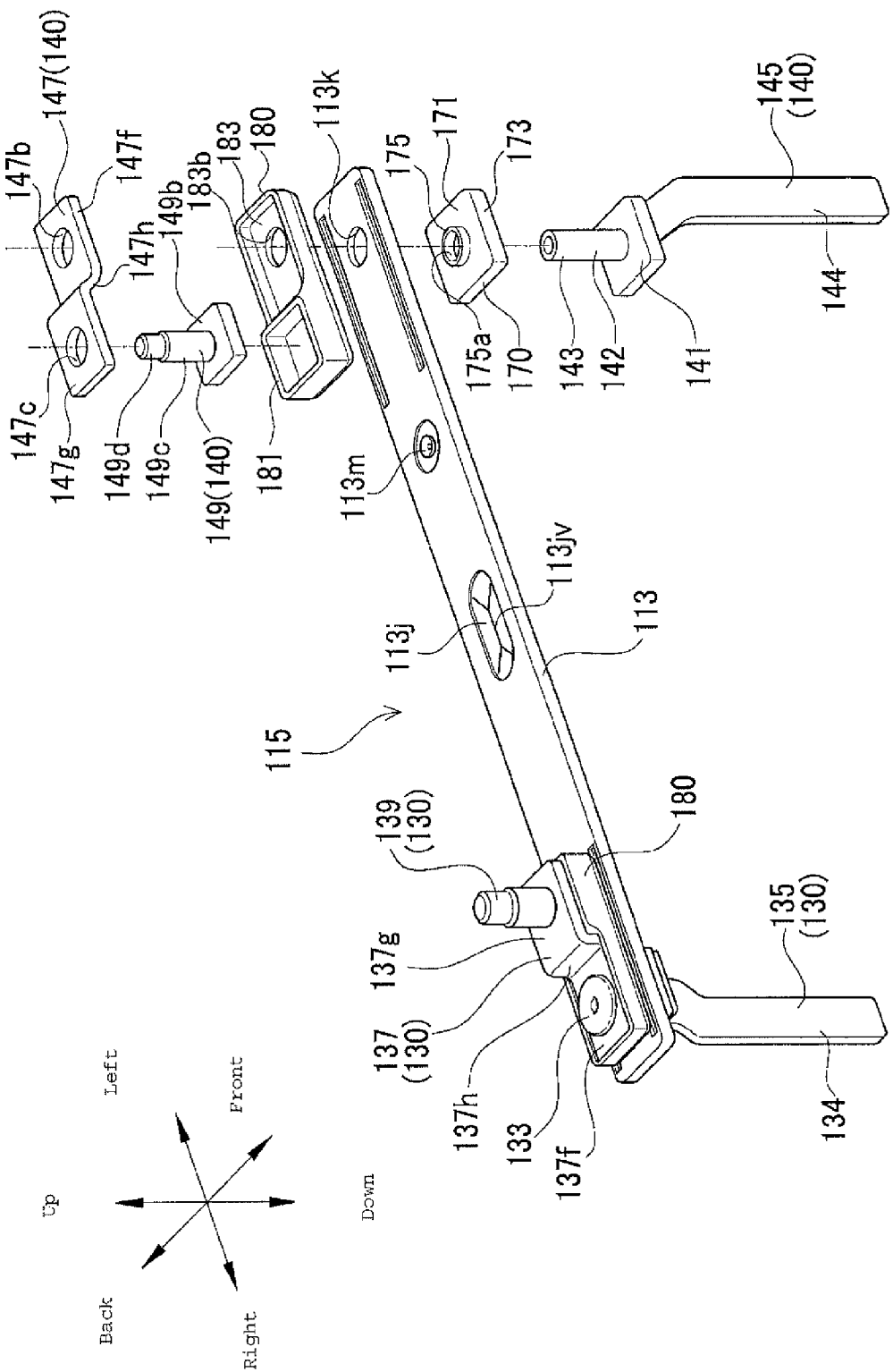
FIG. 3 is a view showing a terminal-attached lid member in the embodiment.

To be concrete, the unparenthesized reference signs denote the members of the section B and the parenthesized reference signs denote the members of the section C. FIG. 3 is a perspective view showing a part of a lid member 115 attached with terminals (terminal-attached lid member) in an exploded manner in the present embodiment.

The battery 100 in the embodiment is, as shown in FIG. 1, a lithium ion secondary battery that includes a case body 111 of a rectangular box shape having an opening 111d, and an electrode body 150 enclosed in the case body 111. The battery 100 further includes a plate-shaped case lid 113 that closes the opening 111d of the case body 111. The case body 111 and the case lid 113 are integrally welded to each other, forming a battery case 110.

The case lid 113 has a rectangular plate-like shape and is formed with circular through holes 113h, 113k each penetrating through the case lid 113 in positions near both ends in a long-side direction (a lateral direction in FIG. 1). The case lid 113 is further provided, at its center in the long-side direction, with a safety valve 113j. This safety valve 113j is formed integral with the case lid 113 to constitute a part of the case lid 113.

The safety valve 113j is formed to be thinner than other portions of the case lid 113 and is formed, on its upper surface, with a groove 113jv (see FIG. 3). Accordingly, the safety valve 113j operates when the internal pressure of the battery case 110 reaches a predetermined pressure. Specifically, the groove 113jv ruptures when the internal pressure reaches the predetermined pressure, thereby allowing gas in the battery case 110 to release out.

The case lid 113 is formed, between the safety valve 113j and the through hole 113k, with a liquid inlet 113n (see FIG. 1) through which electrolyte (not shown) is poured into the battery case 110. In the completed battery 100, this liquid inlet 113n is sealed with a plug 113m.

The battery 100 further includes a positive terminal member 130 and a negative terminal member 140 (external terminal members) each of which is connected to the electrode body 150 inside the case body 111 and extends out through respective through holes 113h and 113k of the case lid 113.

The positive terminal member 130 consists of a positive connecting member 135, a positive outer terminal member 137, and a positive fastening bolt 139 (see FIGS. 1 and 3). The connecting member 135 is connected to the electrode body 150 and extends out through the through hole 113h of the case lid 113. The outer terminal member 137 is located on the case lid 113, that is, outside the battery case 110, and is electrically connected to the connecting member 135 outside the battery case 110. The fastening bolt 139 is located on the case lid 113, that is, outside the battery case 110, and is electrically connected or connectable to the outer terminal member 137. Those connecting member 135, outer terminal member 137, and fastening bolt 139 are all made of aluminum or aluminium.

To be specific, the positive connecting member 135 includes a seat part 131, an insert-through part 132, an electrode body connecting part 134, and a deformed part 133 (see FIGS. 1 to 3). The seat part 131 has a rectangular plate-like shape and is located in the case body 111. The insert-through part 132 has a columnar shape protruding from an upper surface 131f of the seat part 131 and is inserted through the through hole 113h of the case lid 113. The deformed part 133 is a portion continuous with an upper end of the insert-through part 132 and is riveted, that is, deformed to extend in diameter into a circular disk shape, and thus electrically connected to the positive outer terminal member 137. The electrode body connecting part 134 is shaped to extend from a lower surface 131b of the seat part 131 toward a bottom 111b of the case body 111 and is bonded to a positive mixture layer uncoated portion 151b of the electrode body 150. Thus, the positive connecting member 135 and the electrode body 150 are electrically and mechanically connected to each other.

The positive outer terminal member 137 has a nearly Z shape in side view. This outer terminal member 137 includes a fixed part 137f fixed by the deformed part 133, a connection part 137g connected to the fastening bolt 139, and a joint part 137h joining the fixed part 137f and the connection part 137g. The fixed part 137f is formed with a through hole 137b penetrating therethrough. In this through hole 137b, the insert-through part 132 of the positive connecting member 135 is inserted. The connection part 137g is also formed with a through hole 137c penetrating therethrough.

The positive fastening bolt 139 includes a rectangular plate-shaped head portion 139b and a columnar shaft portion 139c. The shaft portion 139c includes a distal end portion formed with screw threads 139d. The shaft portion 139c of the fastening bolt 139 is inserted in the through hole 137c of the positive outer terminal member 137.

The negative terminal member 140 consists of a negative connecting member 145, a negative outer terminal member 147, and a negative fastening bolt 149 (see FIGS. 1 and 3). The connecting member 145 is connected to the electrode body 150 and also extends out through the through hole 113k of the case lid 113. The outer terminal member 147 is located on the case lid 113, that is, outside the battery case 110, and is electrically connected to the connecting member 145 outside the battery case 110. The fastening bolt 149 is located on the case lid 113, that is, outside the battery case 110, and is electrically connected or connectable to the outer terminal member 147. Those connecting member 145, outer terminal member 147, and fastening bolt 149 are all made of copper.

To be concrete, the negative connecting member 145 includes a seat part 141, an insert-through part 142, an electrode body connecting part 144, and a deformed part 143 (see FIGS. 1 to 3). The seat part 141 has a rectangular plate-like shape and is located in the case body 111. The insert-through part 142 has a columnar shape protruding from an upper surface 141f of the seat part 141 and is inserted through the through hole 113k of the case lid 113. The deformed part 143 is a portion continuous with an upper end of the insert-through part 142 and is riveted, that is, deformed to extend in diameter into a circular disk shape, and thus electrically connected to the negative outer terminal member 147. The electrode body connecting part 144 is shaped to extend from a lower surface 141b of the seat part 141 toward the bottom 111b of the case body 111 and is bonded to a negative mixture layer uncoated portion 158b of the electrode body 150. Thus, the negative connecting member 145 and the electrode body 150 are electrically and mechanically connected to each other.

The negative outer terminal member 147 has a nearly Z shape in side view. This outer terminal member 147 includes a fixed part 147f fixed by the deformed part 143, a connection part 147g connected to the fastening bolt 149, and a joint part 147h joining the fixed part 147f and the connection part 147g. The fixed part 147f is formed with a through hole 147b penetrating therethrough. In this through hole 147b, the insert-through part 142 of the negative connecting member 145 is inserted. The connection part 147g is also formed with a through hole 147c penetrating therethrough.

The negative fastening bolt 149 includes a rectangular plate-shaped head portion 149b and a columnar shaft portion 149c. The shaft portion 149c includes a distal end portion formed with screw threads 149d. The shaft portion 149c of the fastening bolt 149 is inserted in the through hole 147c of the negative outer terminal member 147.

The battery 100 further includes a first insulating member 170 interposed between the positive terminal member 130 (i.e., the positive connecting member 135) and the case lid 113 to electrically insulate them from each other. Another first insulating member 170 is also interposed between the negative terminal member 140 (i.e., the negative connecting member 145) and the case lid 113.

To be concrete, each first insulating member 170 is made of electrically insulating resin and includes an insulating interposed part 171, an insulating side wall 173, and an insertion part 175 (see FIGS. 2 and 3). The interposed part 171 has a flat plate-like shape formed, at its center, with a circular through hole 175a in which the insert-through part 132 (insert-through part 142) of the positive terminal member 130 (negative terminal member 140) is inserted. This interposed part 171 is interposed between the upper surface 131f (upper surface 141f) of the seat part 131 (seat part 141) of the positive terminal member 130 (negative terminal member 140) and the case lid 113.

The insulating side wall 173 is a rectangular annular side wall located on a peripheral edge of the insulating interposed part 171. This side wall 173 surrounds an outer peripheral surface 131g (outer peripheral surface 141g) of the seat part 131 (seat part 141). The insertion part 175 has a cylindrical shape protruding from an upper surface 171f of the interposed part 171 and is inserted through the through hole 113h (through hole 113k) of the case lid 113. In a cylindrical hole of this insertion part 175, the insert-through part 132 of the positive terminal member 130 (insert-through part 142 of the negative terminal member 140) is inserted.

The battery 100 further includes a second insulating member 180 made of electrically insulating resin and placed on the case lid 113. This second insulating member 180 is interposed between the positive terminal member 130 (concretely, the positive outer terminal member 137 and the positive fastening bolt 139) and the case lid 113 to electrically insulate them from each other. Another second insulating member 180 is also interposed between the negative terminal member 140 (concretely, the negative outer terminal member 147 and the negative fastening bolt 149) and the case lid 113.

Specifically, each second insulating member 180 includes a head placing part 181 in which a head 139b of the positive fastening bolt 139 (a head 149b of the negative fastening bolt 149) is placed, and a fastening placing part 183 in which the fixed part 137f of the positive outer terminal member 137 (the fixed part 147f of the negative outer terminal member 147) is placed. The fastening placing part 183 is formed with a through hole 183b penetrating therethrough. In this through hole 183b, the insert-through part 132 of the positive terminal member 130 (the insert-through part 142 of the negative terminal member 140) is inserted.

In the present embodiment, the terminal-attached lid member 115 consists of the case lid 113, the electrode terminal members (the positive terminal member 130 and the negative terminal member 140), the first insulating members 170, 170, and the second insulating members 180, 180. Specifically, the positive outer terminal member 137, the second insulating member 180, the case lid 113, the and first insulating member 170 are fixed by clamping between the deformed part 133 and the seat part 131 of the positive terminal member 130. The negative outer terminal member 147, the other second insulating member 180, the case lid 113, and the other first insulating member 170 are fixed by clamping between the deformed part 143 and the seat part 141 of the negative terminal member 140. Thus, they are integrally assembled to form the terminal-attached lid member 115.

In the terminal-attached lid member 115, the insulating interposed part 171 of the first insulating member 170 is placed in an elastically compressed state in a direction of its own thickness (a vertical direction in FIG. 2) between the upper surface 131f (the upper surface 141f) of the seat part 131 (the seat part 141) of the positive terminal member 130 (the negative terminal member 140) and the case lid 113. Furthermore, the insertion part 175 of the first insulating member 170 is elastically compressed in a direction of its own axis (the vertical direction in FIG. 2) so that an end 175b of the insertion part 175 is held in close contact with the second insulating member 180. In this way, the first insulating members 170 seal the through holes 113h and 113k of the case lid 113.

Figure 4:
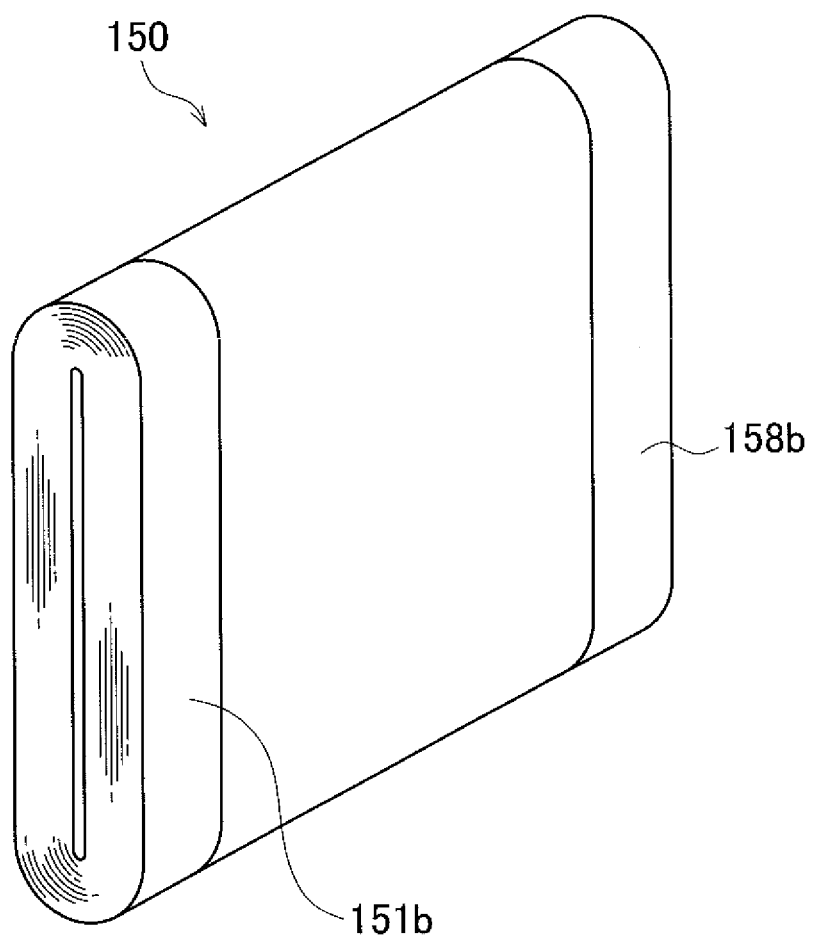
FIG. 4 is a perspective view of an electrode body in the embodiment.
Figure 5:
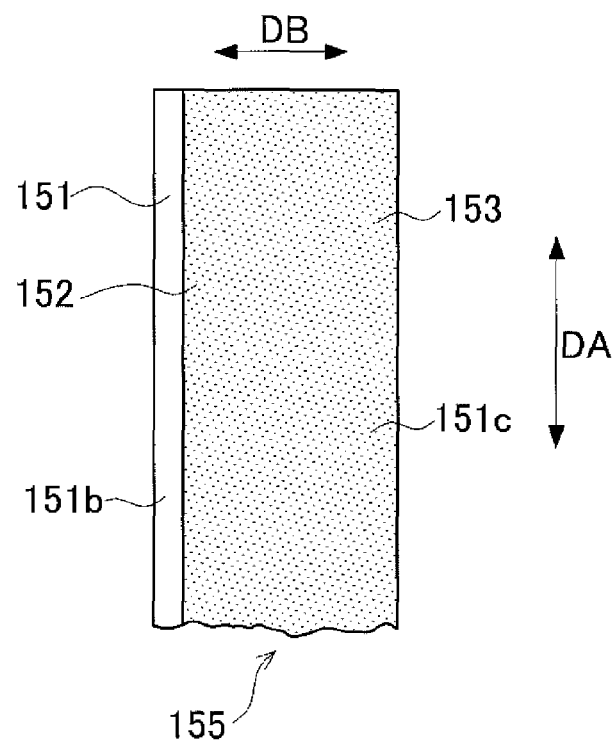
FIG. 5 is a view showing a positive electrode sheet to form the electrode body.

The electrode body 150 is a wound electrode body of a flattened shape, in which a strip-shaped positive electrode sheet 155, a strip-shaped negative electrode sheet 156, and separators 157 are wound together into a flattened shape (see FIGS. 4 to 7). The positive electrode sheet 155 includes a strip-shaped positive substrate 151 being made of aluminum (aluminium) current collector foil and extending in a longitudinal direction DA, and positive electrode mixture layers 152 each placed on part of each surface of the substrate 151 as shown in FIG. 5. The positive electrode mixture layer 152 contains positive active material 153, electrically conductive material made of acetylene black, and PVDF (polyvinylidene fluoride, binder).

Of the positive substrate 151, a portion coated with the positive electrode mixture layers 152 is referred to as a positive mixture layer coated portion 151c, while a portion not coated with the positive electrode mixture layer 152 is referred to as a positive mixture layer uncoated portion 151b. This uncoated portion 151b is located at one end (a left end in FIG. 5) of the substrate 151 (the positive electrode sheet 155) in a width direction DB (a lateral direction in FIG. 5) and extends along one long side of the substrate 151 (the positive electrode sheet 155) in a strip shape extending in the longitudinal direction DA of the substrate 151 (the positive electrode sheet 155), that is, in the vertical direction in FIG. 5.

Figure 6:
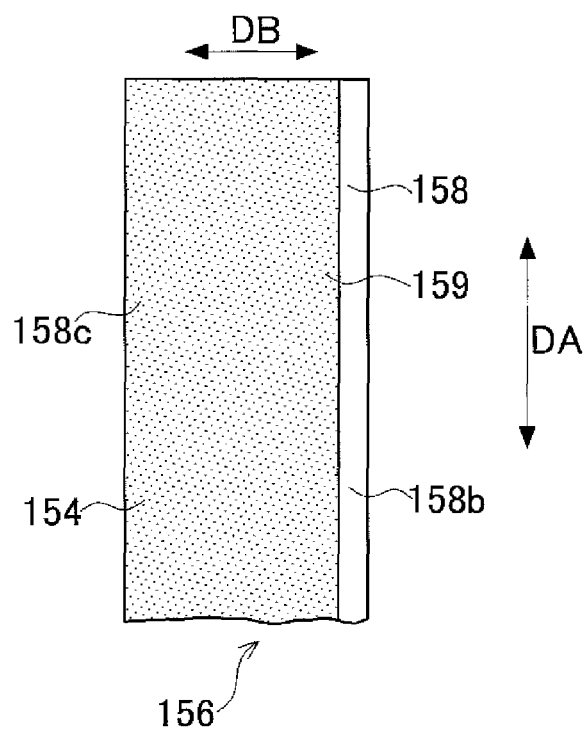
FIG. 6 is a view showing a negative electrode sheet to form the electrode body.

The negative electrode sheet 156 includes a strip-shaped negative substrate 158 being formed of a current collector foil made of copper foil and extending in the longitudinal direction DA, and negative electrode mixture layers 159 each placed on part of each surface of the substrate 158 as shown in FIG. 6. The negative electrode mixture layer 159 contains negative active material 154, SBR (styrene-butadiene rubber, binder), and CMC (carboxymethyl cellulose, thickener).

Of the negative substrate 158, a portion coated with the negative electrode mixture layers 159 is referred to as a negative mixture layer coated portion 158c, while a portion uncoated with the negative electrode mixture layer 159 is referred to as a negative mixture layer uncoated portion 158b. This uncoated portion 158b is located at one end (a right end in FIG. 6) of the substrate 158 (the negative electrode sheet 156) in the width direction DB (a lateral direction in FIG. 6) and extends along one long side of the substrate 158 (the negative electrode sheet 156) in a strip shape extending in the longitudinal direction DA of the substrate 158 (the negative electrode sheet 156), that is, in the vertical direction in FIG. 6.

Figure 7:
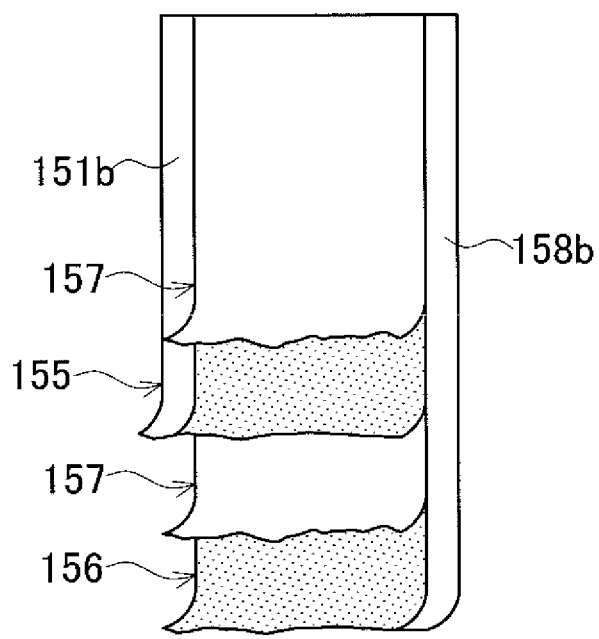
FIG. 7 is a view to explain an overlapping state of the positive and negative electrode sheets and others in the electrode body.

The electrode body 150 in FIG. 4 is configured such that the positive electrode sheet 155, the negative electrode sheet 156, and the separators 157 are wound while overlapping one on another as shown in FIG. 7. Specifically, in an overlapping state in FIG. 7, the positive electrode sheet 155, the negative electrode sheet 156, and two separators 157 are overlapped one on another, and also the positive mixture layer uncoated portion 151*b* and the negative mixture layer uncoated portion 158*b* protrude in opposite directions. The width of each separator 157 is almost equal to the width of the positive mixture layer coated portion 151*c* and the negative mixture layer coated portion 158*c*. In FIG. 4 showing the wound state, therefore, the positive mixture layer uncoated portion 151*b* consists of a plurality of parts of the positive substrate 151 and the negative mixture layer uncoated portion 158*b* consists of a plurality of parts of the negative substrate 158.

In the battery 100 configured as above, a feature of the present invention is in weld portions of the case body 111 and the case lid 113. In the battery 100 shown in a plan view of FIG. 8, the case body 111 and the case lid 113 are welded along their boundary over the entire circumference, forming a weld mark 160.

Prior to explaining the details of the weld mark 160, the distance between the second insulating member 180 of a terminal part and an edge of the case lid 113 will be explained.

Figure 9:
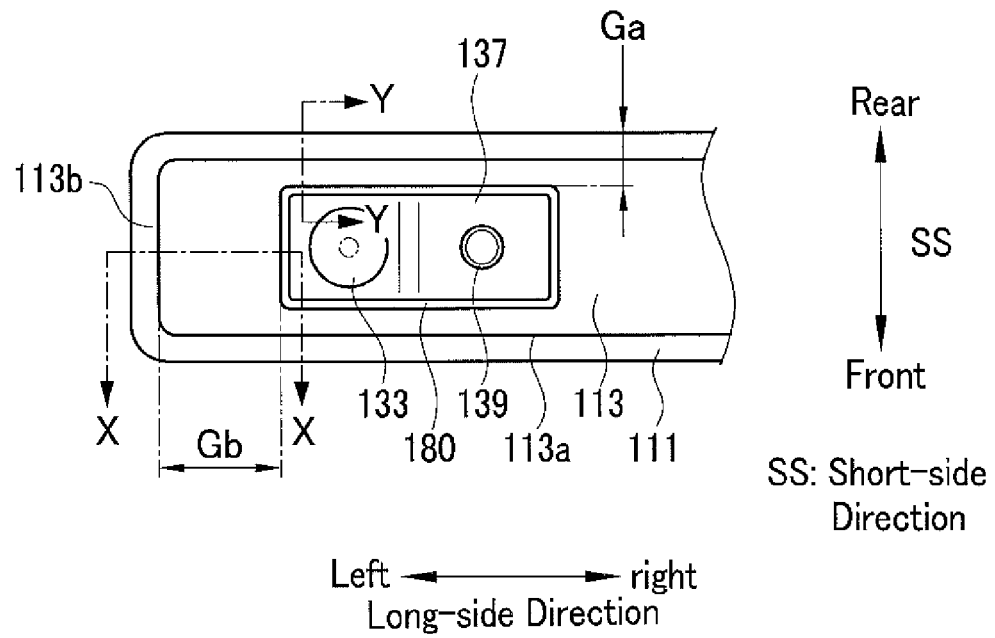
FIG. 9 is a partial plan view of the battery seen from above before welding in the embodiment.

In the battery 100 shown in a partial plan view of FIG. 9, the distance between the second insulating member 180 and the edge of the case lid 113 is different between a long-side direction and a short-side direction. Specifically, an interval Ga between the second insulating member 180 and a long side 113*a* of the case lid 113 is smaller than an interval Gb between the second insulating member 180 and a short side 113*b* of the lid 113. This is because the battery 100 has an entire flattened shape and the case lid 113 has a rectangular shape. FIG. 9 is a plan view showing a state where the lid 113 (the terminal-attached lid member 115) is fitted in the case body 111 but welding is not yet performed (pre-welding state). The configuration on the negative side near the right end, even though it is not illustrated, has the same configuration as above.

Figure 8:
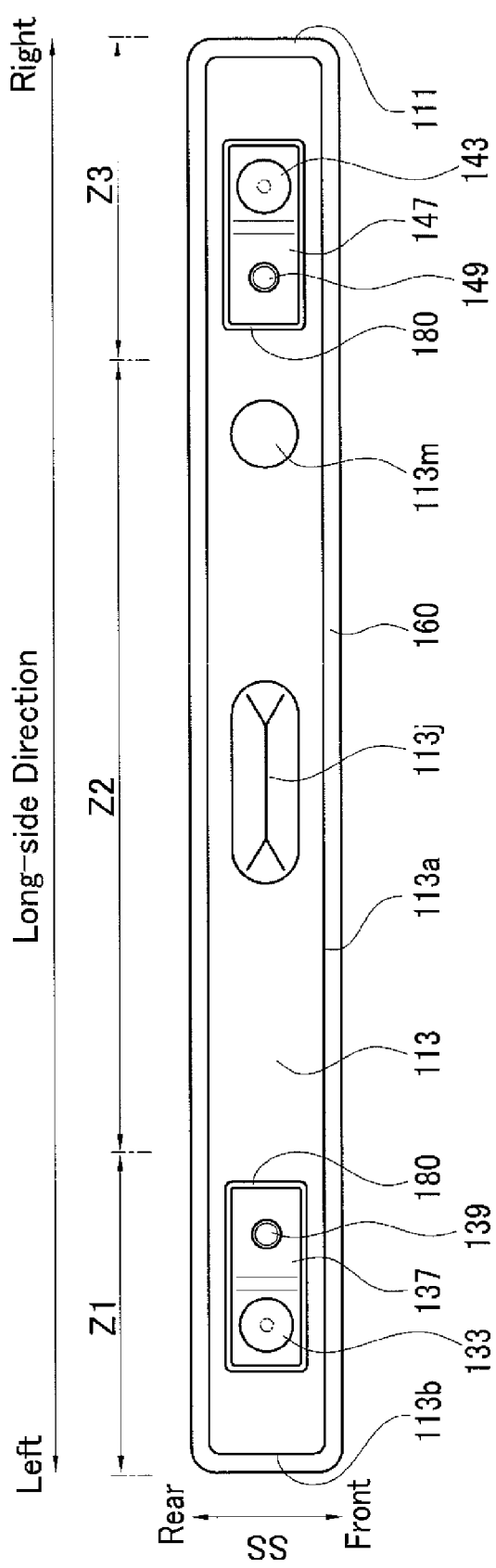
FIG. 8 is a plan view of the battery seen from above in the embodiment.
Figure 10:
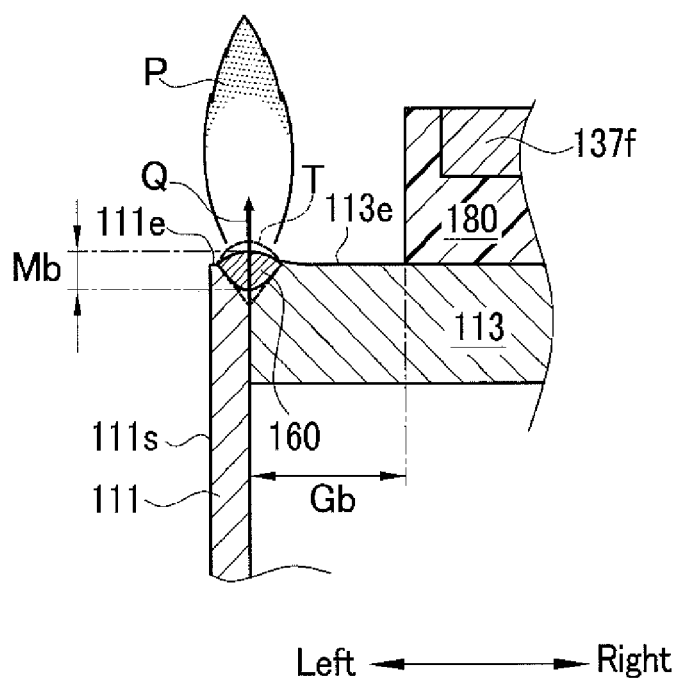
FIG. 10 is a cross sectional view showing a portion taken along a section X in FIG. 9, corresponding to a state in and after welding.
Figure 11:
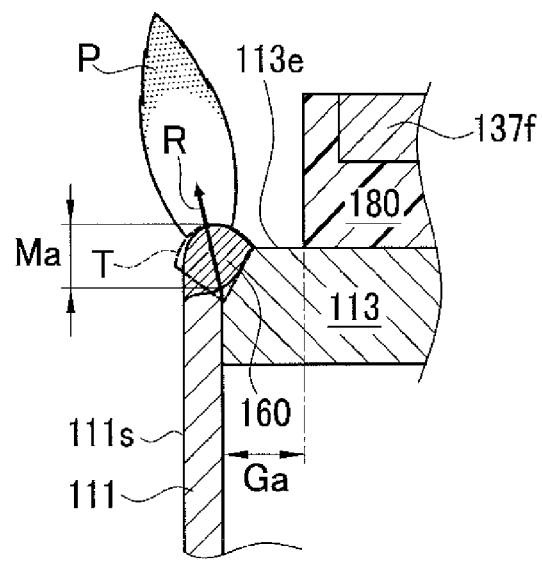
FIG. 11 is a cross sectional view showing a portion taken along a section Y in FIG. 9, corresponding to a state in and after welding.

Returning to the plan view of FIG. 8 showing a post-welding state, the width of the weld mark (a welded portion during welding) 160 is different between in the long side 113*a* and in the short side 113*b* of the case lid 113. The weld mark 160 is wide in the long side 113*a*, while the weld mark 160 is narrow in the short side 113*b*. This will be further explained using cross sectional views. FIG. 10 is a cross sectional view taken along a section X in FIG. 9. FIG. 11 is a cross sectional view taken along a section Y in FIG. 9. From those cross sectional views, it is found that the case lid 113 is larger in plate thickness than the case body 111.

In FIG. 10 showing the short side area, the weld mark 160 extends across an upper surface 113*e* of the case lid 113 and an open end face 111*e* of the case body 111, but does not reach an outer side surface 111*s* of the case body 111. In contrast, in FIG. 11 showing the long side area, the weld mark 160 extends from the upper surface 113*e* of the case lid 113 to the outer side surface 111*s* of the case body 111. This difference between the short side area and the long side area appears as a wide or narrow width of the weld mark 160 in FIG. 8.

The difference between FIG. 10 and FIG. 11 is further explained. When the short side part is welded as shown in FIG. 10, welding energy is set to a relatively small level to melt only the upper surface 113*e* of the case lid 113 and the open end face 111*e* of the case body 111 and not to melt the outer side surface 111*s* of the case body 111. At that time, in FIG. 10, the case lid 113 and the case body 111 are melted substantially uniformly. Thus, an approximate sector shape T of the welded portion is almost vertical. Accordingly, a plume P rises in a direction of an arrow Q corresponding to a center line direction of the approximate sector shape T, that is, upward in a vertical direction. However, owing to the large interval Gb, the second insulating member 180 is not burned by the plume P. It is to be noted that the approximate sector shape T is a sector (a fan-like shape) defined by a part of the surface of the weld mark 160 in section, capable of being approximated to a circular arc, and radial lines from both ends of the circular arc.

On the other hand, when the long side part is to be welded as shown in FIG. 11, the welding energy is set to a larger level than that in welding of the short side part. Thus, a melted range is wider than that in FIG. 10. A weld spreading depth Ma is larger than a weld spreading depth Mb in FIG. 10. However, the melted range does not spread uniformly to the case lid 113 side and the case body 111 side. The melted range more widely spreads on the case body 111 side and does not so widely spread on the case lid 113 side.

The reason is in the difference in plate thickness between the case body 111 and the case lid 113. According to a difference in heat capacity therebetween resulting from the difference in plate thickness, more heat is released on the case lid 113 side than on the case body 111 side. Accordingly, the temperature on the case lid 113 side more sharply increases, so that the melted range spreads more widely on the case body 111 side. In FIG. 11, therefore, the approximate sector shape T of the melted portion and its center line direction R are tilted outward. This causes emission of the plume P in an outward tilting direction. Thus, even if the interval Ga is small, the second insulating member 180 is not burned by the plume P.

Figure 12:
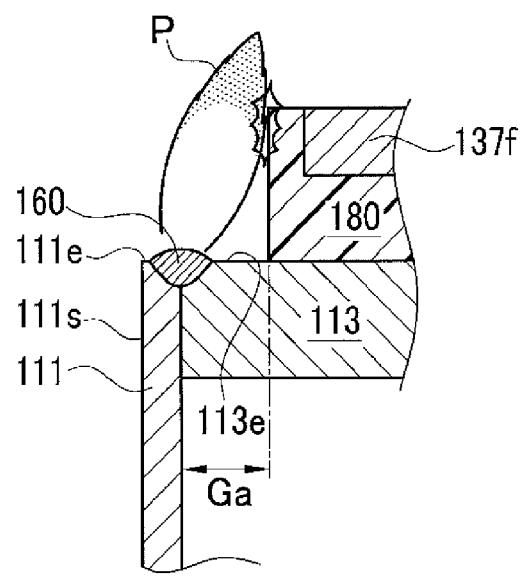
FIG. 12 is a cross sectional view showing a portion taken along a section Y, corresponding to a state in welding in a comparative example.

If the long side part is welded with low welding energy in a similar manner to that in FIG. 10, an almost vertical plume P is emitted from an edge (a long side) of the case lid 113, even though the interval Ga is small. That is, the plume P is present immediately close to the second insulating member 180, which may burn the second insulating member 180. In particular, if the plume P flickers due to ambient airflow or the like, the plume P is likely to easily impinge on the second insulating member 180 as shown in FIG. 12. In the present embodiment, in contrast, the long side part is welded with high welding energy to prevent the above defect. The welding method itself may be selectable from any methods capable of welding in non-contact relation with respect to a welded portion, such as laser welding.

Figure 13:
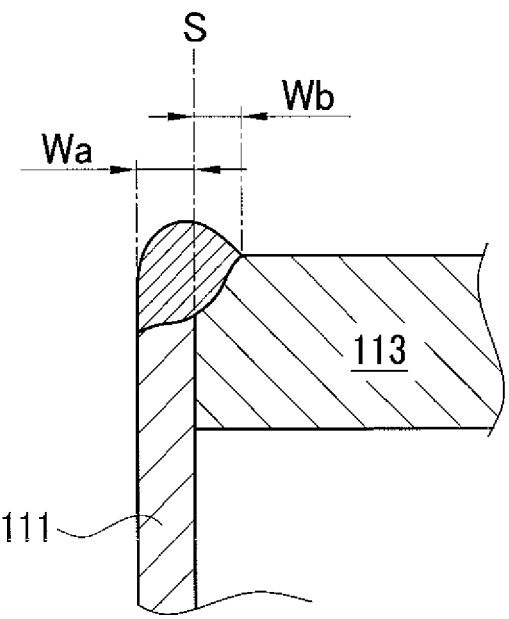
FIG. 13 is a cross sectional view to further explain a welding area shown in FIG. 11.

The weld mark 160 on the long side part shown in FIG. 11 can be further explained as below. As shown in FIG. 13, it is conceivable to define a weld spreading width Wa into the case body 111 and a weld spreading width Wb into the case lid 113 when seen from above with reference to an extended line S of the boundary between the case body 111 and the case lid 113 in their unmelted portions. In this state, the width Wa is larger the width Wb. That is, a value of "Wa/Wb" is larger than 1. If this is applied to the weld mark 160 of the short side part in FIG. 10, the value of "Wa/Wb" is approximately 1. In the weld mark 160 of the long side part, accordingly, the value of "Wa/Wb" can be said to be larger than that in the weld mark 160 of the short side part. Further, the value of Wa itself is larger in the long side part than in the short side part.

Figure 14:
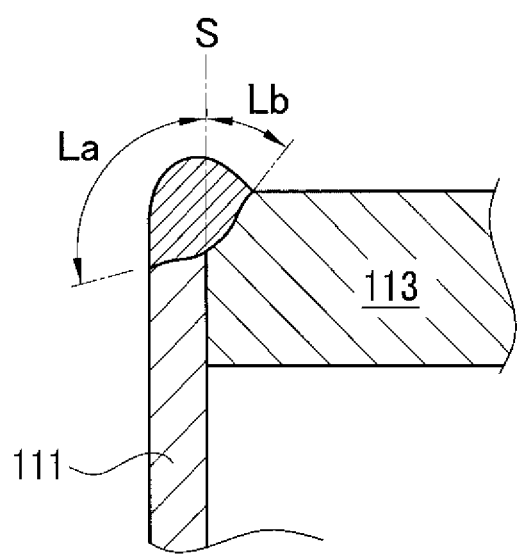
FIG. 14 is a cross sectional view to further explain the welding area shown in FIG. 11.
Figure 15:
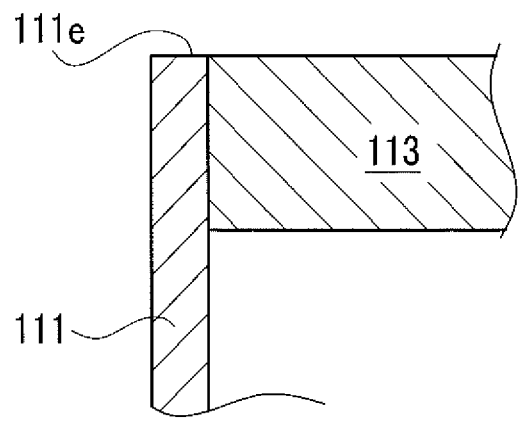
FIG. 15 is a cross sectional view showing an appearance of a welding area before welding in the embodiment.

As shown in FIG. 14, similarly, it is conceivable to define a surface length La of the weld mark 160 on the case body 111 side and a surface length Lb on the case lid 113 side with reference to the extended line S in section. Also in this respect, a surface length La is longer than a surface length Lb. A value of "La/La" can be said to be larger in the weld mark 160 of the long side part than in the weld mark 160 of the short side part. The value of La itself is larger in the long side part than in the short side part.

Meanwhile, the present invention is applied to a configuration that the open end face 111e of the case body 111 is not covered by the case lid 113 after the case lid 113 (terminal-attached lid member 115) is set in the case body 111 but before welding is performed. This is because such a configuration causes a plume P during welding to rise toward the upper surface of the case lid 113, that is, to the side where the second insulating member 180 is located.

Figure 16:
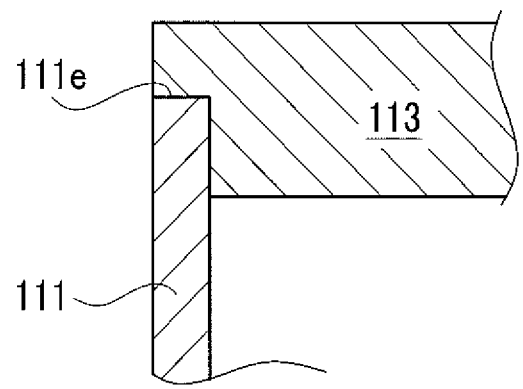
FIG. 16 is a cross sectional view showing an appearance of a welding area before welding in the comparative example.
Figure 17:
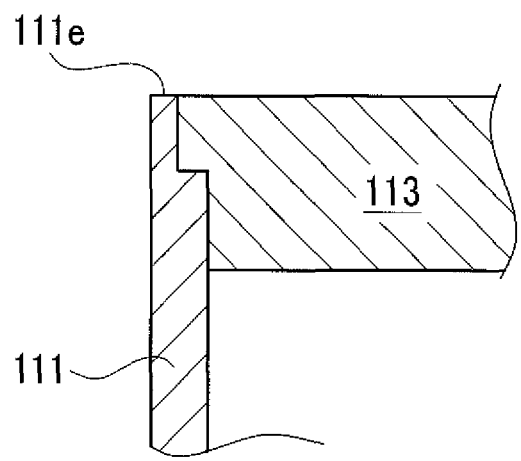
FIG. 17 is a cross sectional view showing an appearance of a welding area before welding in a modified example of the present invention.
Figure 18:
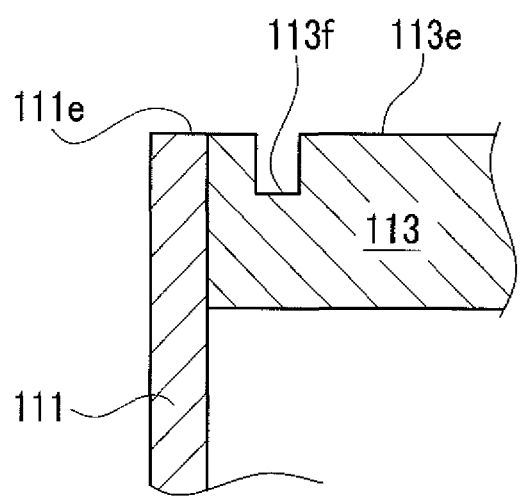
FIG. 18 is a cross sectional view showing an appearance of a welding area before welding in another modified example of the present invention.

On the other hand, the present invention is not applied to a configuration that the open end face 111e is covered by the case lid 113 before welding as shown in FIG. 16. This is because such a configuration is unlikely by nature to cause a plume P during welding to influence the second insulating member 180. In contrast, such a configuration shown in FIG. 17 that the open end face 111e is exposed without being covered by the case lid 113 falls within a range of application of the present invention. Moreover, the present invention may also be applied to any configuration that the upper surface 113e of the case lid 113 is formed in a different shape from those explained above, e.g., formed with a groove 113f in FIG. 18. In FIGS. 13 to 18, the second insulating member 180 and others shown in FIG. 11 and other figures are not illustrated.

In the present invention, the wide-width weld mark 160 shown in FIG. 11 has to be provided in at least a region facing the second insulating members 180 near both ends of the case lid 113. In other words, the region corresponds to zones Z1 and Z3 in FIG. 8. In a zone Z2 intermediate between the zones Z1 and Z3, a wide-width weld mark 160 may be formed as in the zones Z1 and Z3 or a narrow-width weld mark 160 may be formed as in the short side area in FIG. 10. However, it is more advantageous from the viewpoint of bonding strength that the wide-width weld mark 160 is formed in the zone Z2. It may be further arranged that the wide-width weld mark 160 shown in FIG. 11 may be formed over the entire circumference of the case lid 113. In an actual product, even in the zone(s) in which a narrow-width weld mark 160 shown in FIG. 10 is formed by welding with low energy, the weld mark 60 may locally reach some portions of the outer side surface 111s of the case body 111.

The planar shape of the case lid 113 is explained above as a rectangular plate-like shape, but may have round corners as shown in FIG. 8. In short, any shape may be adopted as long as it has recognizable long side parts and short side parts. As an alternative, another shapes having nonlinear short side parts as shown in FIGS. 19 and 20 may also be adopted.

According to the present embodiment explained in detail above, for the battery 100 of a flattened shape, in which the open end face 111e of the case body 111 is not covered by the case lid 113 at the stage before welding, different levels of welding energy are set for the short side part and the long side part of the case lid 113 so that the welding energy is higher for the long side part than for the short side part. Accordingly, when the long side part facing the second insulating member(s) 180 is to be welded, the case body 111 is more melted, thus causing a plume P to be ejected in an outward tilting direction. This can achieve the battery 100 configured to prevent damage on the second insulating members 180 and others on the case lid 113 due to a plume P during welding and a method for producing the battery.

The above embodiments are mere example and do not limit the present invention. The present invention may be embodied in other specific forms without departing from the essential characteristics thereof.

REFERENCE SIGNS LIST

111 Case body
111e Open end face of case body
113 Case lid (Lid member)
113e Upper surface of case lid
130, 140 Terminal member (External terminal member)
150 Electrode body
160 Weld mark
180 Second insulating member (Insulating member)
Ga, Gb Interval
La, Lb Surface length, of weld mark
Q, R Center line direction of approximate sector shape
T Approximate sector shape
Wa, Wb Weld spreading width of weld mark
Z1, Z3 Zone facing insulating member
Z2 Zone between zones Z1 and Z3

The invention claimed is:
1. A battery including:
a case body having a flattened shape and including an open end and internally containing a power generating element;
a lid member formed in a shape having long side parts and short side parts and placed to close an opening of the case body;
external terminal members provided to penetrate through the lid member and connected to the power generating element in the case body and partially exposed to an outside of the lid member; and
insulating members placed on at least an upper surface of the lid member to insulate the external terminal members from the lid member,
wherein:
an interval between an edge of each of the insulating members and a long side of the lid member is smaller than an interval between an edge of each of the insulating members and a short side of the lid member,
the lid member is fitted in the opening of the case body,
a weld mark extending across the upper surface of the lid member and an open end face of the case body is formed along an entire circumference of the lid member so that the lid member is fixed to the case body and an inside of the case body is hermetically sealed from an external environment,
a zone of the lid member along the long side at least facing one of the insulating members is a wide-width weld mark zone in which the weld mark is formed to reach an outer side surface of the case body in addition to the upper surface of the lid member and the open end face of the case body,
the weld mark is formed to have a weld spreading depth of a cross section that is larger in the wide-width weld mark zone than in a zone other than the wide-width weld mark zone,
the weld mark is formed to be spread into the lid member from an extended line extended to a surface of the weld mark from a boundary between the lid member and the case body in an unmelted portion during welding, and the external terminal members and the insulating members are respectively provided in positions close to both end of the lid member in a long side direction.

2. The battery according to claim 1, wherein a center line direction of an approximate sector shape defined by a portion having a circular arc surface of the weld mark in cross section is tilted more outward in the wide-width weld mark than in a zone other than the wide-width weld mark.

3. The battery according to claim 2, wherein the lid member is larger in plate thickness than the case body.

4. The battery according to claim 2, wherein the wide-width weld mark zone is formed in the long side direction of the lid member over a zone facing one of the insulating members, a zone facing another of the insulating members, and an intermediate zone between the zones.

5. The battery according to claim 1, wherein a value obtained by dividing a weld spreading width of the weld mark into the case body by a weld spreading width into the lid member when the weld mark is seen from outside with respect to the boundary is larger in the wide-width weld mark zone than in the zone other than the wide-width weld mark zone.

6. The battery according to claim 5, wherein the lid member is larger in plate thickness than the case body.

7. The battery according to claim 5, wherein the wide-width weld mark zone is formed in the long side direction of the lid member over a zone facing one of the insulating members, a zone facing another of the insulating members, and an intermediate zone between the zones.

8. The battery according to claim 1, wherein a value obtained by dividing a surface length of the weld mark located within the case body by a surface length within the lid member in cross section with respect to the extended line is larger in the wide-width weld mark than in the zone other than the wide-width weld mark.

9. The battery according to claim 8, wherein the lid member is larger in plate thickness than the case body.

10. The battery according to claim 8, wherein the wide-width weld mark zone is formed in the long side direction of the lid member over a zone facing one of the insulating members, a zone facing another of the insulating members, and an intermediate zone between the zones.

11. The battery according to claim 1, wherein the wide-width weld mark zone is formed in the long side direction of the lid member over a zone facing one of the insulating members, a zone facing another of the insulating members, and an intermediate zone between the zones.

12. The battery according to claim 11, wherein the lid member is larger in plate thickness than the case body.

13. The battery according to claim 1, wherein the lid member is larger in plate thickness than the case body.

14. A method for producing a battery including: a case body having a flattened shape and including an open end and internally containing a power generating element; and a lid member formed in a shape having long side parts and short side parts and placed to close an opening of the case body, the method comprising:
    fitting the lid member in the opening of the case body without covering an open end face of the case body; and
    welding a boundary between an upper surface of the lid member and the open end face of the case body along an entire circumference of the lid member to fix the member to the case body and hermetically seal an inside of the case body from an external environment to form a weld mark having a weld spreading depth of a cross section that larger in a wide-width weld mark zone than in a zone other than the wide-width weld mark zone, the wide-width weld mark zone of the weld mark being formed to reach an outer side surface of the case body in addition to the upper surface of the lid member and the open end face of the case body,
wherein:
    the battery to be produced comprises:
        external terminal members provided to penetrate through the lid member and connected to the power generating, element in the case body and partially exposed to an outside of the lid member: and
        insulating members placed on at least the upper surface of the lid member to insulate the external terminal members from the lid member,
    the external terminal members and the insulating members are placed in positions close to both ends of the lid member in a long side direction,
    an interval between an edge of each of the insulating members and a long side of the lid member is smaller than an interval between an edge of each of the insulating members and a short side of the lid member, and
    energy used for the welding of the zone other than the wide-width weld mark zone is set to be less than energy used for welding of the wide-width weld mark zone.

15. The method for producing a battery according to claim 14, wherein
    the battery to be produced is configured such that the external terminal members and the insulating members are respectively provided in positions close to both ends of the lid member in the long side direction, and
    the welding using the for welding of the wide-width weld mark zone is performed on the lid member in the long side direction over the zone facing one of the insulating members, the zone facing another of the insulating members, and an intermediate zone between the zones.

* * * * *